(12) United States Patent
Leimann et al.

(10) Patent No.: US 10,927,941 B2
(45) Date of Patent: Feb. 23, 2021

(54) COMBINED ANTI-FRICTION AND PLAIN BEARING MOUNTING FOR A GEARBOX SHAFT

(71) Applicants: ZF Friedrichshafen AG, Friedrichshafen (DE); ZF WIND POWER ANTWERPEN N.V., Lommel (BE)

(72) Inventors: Dirk Leimann, Edegem (BE); Michiel Van den Donker, GM Best (NL); Tino Kirschner, Friedrichshafen (DE)

(73) Assignees: ZF FRIEDRICHSHAFEN AG, Friedrichsh Afen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 15/100,789

(22) PCT Filed: Nov. 18, 2014

(86) PCT No.: PCT/EP2014/074837
§ 371 (c)(1),
(2) Date: Jun. 1, 2016

(87) PCT Pub. No.: WO2015/090791
PCT Pub. Date: Jun. 25, 2015

(65) Prior Publication Data
US 2016/0298753 A1    Oct. 13, 2016

(30) Foreign Application Priority Data

Dec. 18, 2013 (DE) .......... 10 2013 226 527

(51) Int. Cl.
*F16H 57/021* (2012.01)
*F16C 21/00* (2006.01)
(Continued)

(52) U.S. Cl.
CPC .......... *F16H 57/021* (2013.01); *F03D 15/00* (2016.05); *F03D 80/70* (2016.05); *F16C 21/00* (2013.01);
(Continued)

(58) Field of Classification Search
CPC ..... F16H 2057/0216; F16H 2057/0221; F16C 32/0688; F16C 23/048; F16C 17/10;
(Continued)

(56) References Cited

U.S. PATENT DOCUMENTS 536,048 A * 3/1895 Schofield ................ F16C 33/08
384/296
3,844,182 A * 10/1974 Bradshaw ................ B62D 3/12
74/422

(Continued)

FOREIGN PATENT DOCUMENTS

DE   10 2006 042 340 A1   3/2008
DE   10 2007 051 418 A1   4/2009
(Continued)

OTHER PUBLICATIONS

Plain Bearings Outperform Rolling-Element Bearings; Bennet, Graham; Apr. 7, 2009; https://www.machinedesign.com/technologies/plain-bearings-outperform-rolling-element-bearings (Year: 2009).*

(Continued)

*Primary Examiner* — Bobby Rushing, Jr.
(74) *Attorney, Agent, or Firm* — Davis & Bujold PLLC; Michael J. Bujold

(57) ABSTRACT

A transmission shaft (1), designed particularly for a wind turbine, which is mounted by way of a fixed bearing (2, 3) and at least one floating bearing (4). At least one gearwheel (5) is fixed onto the transmission shaft (1) and positioned in the axial direction between the fixed bearing (2, 3) and the floating bearing (4). The fixed bearing (2, 3) is formed by at (Continued)

least one roller bearing and the floating bearing (4) is in the form of at least one slide bearing.

10 Claims, 1 Drawing Sheet

(51) Int. Cl.
*F03D 80/70* (2016.01)
*F03D 15/00* (2016.01)

(52) U.S. Cl.
CPC ....... *F05B 2240/50* (2013.01); *F16C 2360/31* (2013.01); *F16H 2057/0216* (2013.01)

(58) Field of Classification Search
CPC ...... F16C 25/04; F16C 2360/31; F16C 35/02; F16C 35/067; F03D 80/70; F05B 2240/50; F05B 2240/54; Y02E 10/722
USPC ................................. 384/296, 439; 74/606 R
See application file for complete search history.

(56) References Cited

U.S. PATENT DOCUMENTS

| | | | | |
|---|---|---|---|---|
| 4,026,611 A * | 5/1977 | Stanwell-Smith | ...... | F16C 35/02 384/439 |
| 5,018,402 A * | 5/1991 | Roerig | ............... | F16H 1/227 384/558 |
| 5,219,231 A * | 6/1993 | Sheedy | ................. | F16C 23/045 384/192 |
| 6,799,894 B2 * | 10/2004 | Fidziukiewicz | ........ | F16C 17/02 384/296 |
| 7,410,442 B2 * | 8/2008 | Fox | ...................... | F16C 19/364 475/343 |
| 7,441,960 B2 * | 10/2008 | Brandenstein | ......... | A61B 6/035 384/535 |
| 7,927,020 B2 * | 4/2011 | Faust | ...................... | F16C 27/04 384/535 |
| 8,172,535 B2 * | 5/2012 | Nitzpon | .................. | F03D 80/70 416/170 R |
| 8,177,672 B2 * | 5/2012 | Kato | ..................... | B60K 17/344 475/198 |
| 8,313,298 B2 * | 11/2012 | Berger | ................... | F03D 80/00 416/170 R |
| 8,790,213 B1 * | 7/2014 | Isayama | .................. | F16C 17/02 475/346 |
| 8,968,149 B2 | 3/2015 | Walliser et al. | | |
| 9,011,010 B2 * | 4/2015 | Mueller | ................ | F03D 7/0224 384/221 |
| 2009/0247352 A1 * | 10/2009 | Kamiya | .................. | F16H 15/42 476/8 |
| 2009/0273250 A1 | 11/2009 | Huesges et al. | | |
| 2011/0077120 A1 * | 3/2011 | Dirk | ......................... | F03D 15/00 475/348 |
| 2011/0142598 A1 * | 6/2011 | Andersen | .............. | F16C 35/077 415/122.1 |
| 2011/0148113 A1 * | 6/2011 | Li | ......................... | F03D 7/0296 290/44 |
| 2011/0150383 A1 * | 6/2011 | Yoshida | .................. | F16C 23/08 384/590 |
| 2011/0162685 A1 * | 7/2011 | Weiden | ................... | F16C 17/02 136/244 |
| 2012/0134811 A1 * | 5/2012 | Bagepalli | ................ | F03D 80/70 416/1 |
| 2012/0134830 A1 * | 5/2012 | Tozzi | .................... | F03D 7/0212 416/169 R |
| 2012/0177311 A1 * | 7/2012 | Isayama | ................ | F16H 57/082 384/416 |
| 2012/0186896 A1 * | 7/2012 | Yamamoto | .......... | B62D 5/0448 180/444 |
| 2013/0104681 A1 | 5/2013 | Galivel | | |
| 2013/0118444 A1 * | 5/2013 | Harada | ..................... | F16C 9/02 123/198 R |
| 2013/0172145 A1 * | 7/2013 | Mourani | ............... | F16H 1/2836 475/221 |
| 2014/0260727 A1 * | 9/2014 | Webber | ............... | B62D 5/0424 74/89.23 |
| 2015/0078808 A1 * | 3/2015 | Halcom | ............... | F16C 23/045 403/119 |
| 2015/0330452 A1 * | 11/2015 | Mongeau | ........... | F16C 33/6659 290/55 |
| 2018/0245571 A1 * | 8/2018 | Adler | ...................... | F03D 15/00 |
| 2019/0107146 A1 * | 4/2019 | Meyer | ..................... | F16C 17/10 |

FOREIGN PATENT DOCUMENTS

| | | | | |
|---|---|---|---|---|
| DE | 10 2008 024 049 A1 | 11/2009 | | |
| DE | 10 2009 058 355 A1 | 6/2011 | | |
| DE | 10 2011 076 114 A1 | 11/2012 | | |
| EP | 1184567 A2 * | 3/2002 | ............ | F16H 1/227 |
| EP | 1 335 154 A1 | 8/2003 | | |
| GB | 339 723 | 12/1930 | | |
| JP | S49-34269 Y1 | 9/1974 | | |
| JP | S53-112656 A | 9/1978 | | |
| JP | S55-40225 U | 3/1980 | | |
| JP | S59-58262 A | 4/1984 | | |
| JP | S60-77848 U | 5/1985 | | |
| JP | S62-151468 U | 9/1987 | | |
| JP | 03140622 A * | 6/1991 | | |
| JP | H07-151212 A | 6/1995 | | |
| JP | 2007321802 A * | 12/2007 | ............ | F16C 33/46 |
| JP | 2013-096563 A | 5/2013 | | |

OTHER PUBLICATIONS

High Reliability and Low Friction Bearings for Wind Turbines; Ubogu, Emamode A; Nov. 2, 2010; University of Sheffield Mini-Project (Year: 2010).*
Advantages of KS PERMAGLIDE® plain bearings over rolling bearings / ball bearings; Aug. 2015; https://mam.rheinmetall-automotive.com/mc/epaper?guid=16271ac9e9eed92c (Year: 2015).*
German Search Report Corresponding to 10 2013 226 527.1 dated Dec. 16, 2014.
International Search Report Corresponding to PCT/EP2014/074837 dated May 27, 2015.
Written Opinion Corresponding to PCT/EP2014/074837 dated May 27, 2015.

* cited by examiner

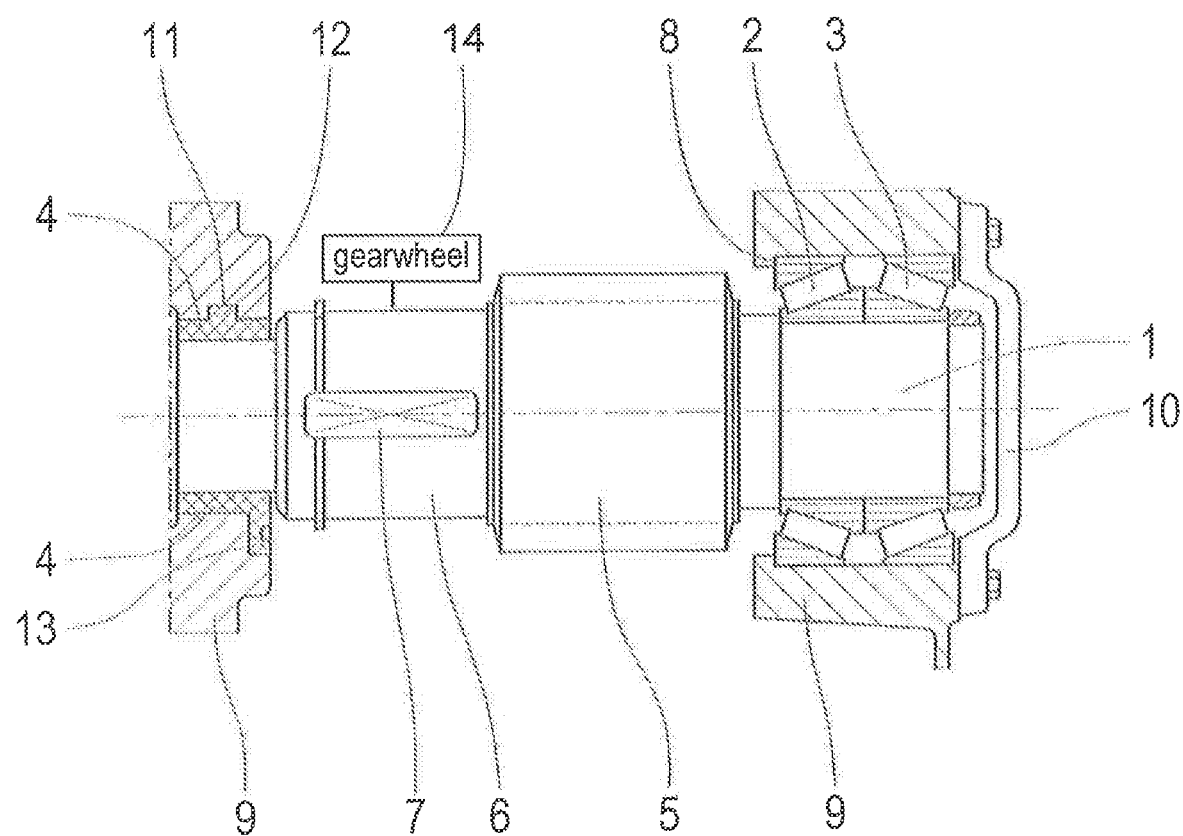

COMBINED ANTI-FRICTION AND PLAIN BEARING MOUNTING FOR A GEARBOX SHAFT

This application is a National Stage completion of PCT/EP2014/074837 filed Nov. 18, 2014, which claims priority from German patent application serial no. 10 2013 226 527.1 filed Dec. 18, 2013.

FIELD OF THE INVENTION

The present invention concerns the mounting of a transmission shaft, in particular a transmission shaft of a transmission of a wind turbine.

BACKGROUND OF THE INVENTION

To mount the spur gear stage of a transmission of a wind turbine, it is usual to use fixed and floating bearings. Both the fixed bearing and the floating bearing are in the form of roller bearings. The fixed bearing for absorbing radial and axial forces consists of a pair of aligned conical roller bearings. These can be prestressed, to prevent the occurrence of slip and 'black spots'. The floating bearing is usually in the form of a cylindrical roller bearing. This is operated without prestress. Thus, the cylindrical roller bearing in particular is liable to sustain damage.

A possible means for making the mounting of shafts more resistant to damage are slide bearings. Thus solutions for wind turbine transmissions are known, in which all the shafts of the spur gear stage are mounted entirely in slide bearings. In this case slide bearings are also used for the fixed bearings. However, slide bearings that can absorb forces in both the radial and axial directions are very costly.

SUMMARY OF THE INVENTION

The purpose of the present invention is to design the mounting of a transmission shaft in such manner that the disadvantages of the solutions known from the prior art are avoided.

The invention is based on the idea of combining roller bearings with slide bearings on one and the same shaft. Roller and slide bearings each have specific advantages and disadvantages. Thus, when roller and slide bearings are combined their disadvantages are usually also combined. By virtue of the present invention, however, a mounting is produced in which the disadvantages of the individual bearing types are not noticeable. Instead, the mounting according to the invention for a transmission shaft benefits essentially from the advantages of roller bearings on the one hand and slide bearings on the other hand.

A transmission shaft according to the invention is mounted by means of a fixed bearing and at least one floating bearing. The fixed bearing can absorb radial and axial forces both in the positive and in the negative direction. Thus, all translational degrees of freedom of the shaft are restricted in the fixed bearing.

The floating bearing can absorb only radial forces, in both the positive and the negative direction. Thus, the floating bearing restricts the translational degrees of freedom of the shaft in just one direction. Together with the fixed bearing it also fixes the shaft along its rotational axis, i.e. it restricts rotational degrees of freedom of the shaft that extend perpendicularly to the rotational axis.

In the axial direction between the fixed bearing and the floating bearing is arranged at least one gearwheel fixed on the transmission shaft. The gearwheel is connected solidly to the transmission shaft. Thus, the rotational axis of the gearwheel is identical to the rotational axis of the transmission shaft. Preferably, the gearwheel is a spiral-toothed gear. The arrangement of the gearwheel in the axial direction between the fixed bearing and the floating bearing means that the gearwheel is in the intermediate space between the fixed bearing and the floating bearing. In particular, the orthogonal projections of the gearwheel on the rotational axis of the shaft are all between the orthogonal projections of the floating bearing on the rotational axis of the shaft and the orthogonal projections of the fixed bearing on the rotational axis of the shaft.

The fixed bearing is formed by at least one roller bearing. Preferably, the fixed bearing consists exclusively of roller bearings, in particular of exactly two roller bearings.

According to the invention, the floating bearing is formed by at least one slide bearing, preferably exactly one slide bearing.

In a preferred further development of the invention the fixed bearing is in the form of an in-line mounting arrangement. An in-line mounting comprises two bearings, each able to absorb forces in at least one axial direction. The two directions of the axial force absorption extend oppositely to one another, i.e. away from one another or toward one another. Preferably, the two bearings are arranged in a mirror-image configuration relative to one another. To set the desired bearing play or prestress, a bearing race—an inner or outer race—of one of the two bearings is pushed onto a seating and then fixed. Preferably two conical roller bearings are used. These can be in an O-configuration relative to one another, but are preferably in an X-configuration.

The transmission shaft according to the invention is particularly suitable for use in the spur gear stage of a transmission of a wind turbine. The transmission according to the invention can be used as an intermediate shaft. An intermediate shaft is understood to mean any shaft which is not the input or drive input shaft, or the output or drive output shaft.

Moreover, the transmission shaft according to the invention can be used as the input or drive input shaft, and/or the output or drive output shaft. In particular, use as the input or drive input shaft, and/or the output or drive output shaft in combination with use as an intermediate shaft is possible.

BRIEF DESCRIPTION OF THE DRAWINGS

Example embodiments of the invention are explained below with reference to the lone FIG.

In detail the one FIG shows an intermediate shaft mounted by means of a roller bearing and a slide bearing.

DETAILED DESCRIPTION OF THE PREFERRED EMBODIMENTS

On the right-hand side of the representation shown in the FIG, the intermediate shaft 1 is mounted by means of a fixed bearing. The fixed bearing consists of a first conical rover bearing 2 and a second conical rover bearing 3.

On the left-hand side of the FIG, the intermediate shaft 1 is mounted by means of a floating bearing 4. In addition, the intermediate shaft 1 has a gearwheel 5. A further gearwheel 14, diagrammatically shown in the FIG, is fixed on a shaft seating 6 by means of a keyway 7. Thus, in the axial direction the individual elements are arranged on the intermediate shaft 1—from left to right in the FIG—in the following order:

slide bearing 4, shaft seat 6, gearwheel 5, first conical roller bearing 2 and second conical roller bearing 3.

In the axial direction, the first conical roller bearing 2 and the second conical roller bearing 3 are fixed between a shoulder 8 in a transmission housing 9 and a bearing cover 10 bolted onto the transmission housing 9. The FIG shows a fixing arrangement in which there is some play. Alternatively fixing with no play, i.e. with some prestress would be possible.

The FIG shows two alternative possibilities for fixing the slide bearing 4, As shown in the upper part of the FIG, the transmission housing 9 can have a circular groove 11 extending around the rotational axis of the intermediate shaft 1. In this case the slide bearing 4 has on its outer surface a raised portion 12 that extends in the circumferential direction or a circumferential ridge 12 on the outer surface, which fits into the groove 11.

Alternatively, as shown in the lower portion of the FIG, the slide bearing 4 can be fixed by means of a radially directed, circular flange, which is part of the slide bearing 4 and extends around the rotational axis of the intermediate shaft. The flange 13 is bolted onto the transmission housing 9.

INDEXES

1 Intermediate shaft
2 Conical rover bearing
3 Conical roller bearing
4 Slide bearing
5 Gearwheel
6 Shaft seat
7 Keyway
8 Shoulder
9 Transmission housing
10 Bearing cover
11 Groove
12 Ridge
13 Flange

The invention claimed is:

1. A transmission shaft being mounted by at least one fixed bearing and at least one floating bearing within a transmission housing of a wind turbine, the transmission shaft defining a rotational axis,
   the transmission housing having cylindrical surface with a circular groove therein;
   at least one gearwheel being fixed on the transmission shaft in an axial direction between the at least one fixed bearing and the at least one floating bearing, and the at least one gearwheel having a radially outermost surface,
   the fixed bearing being formed by at least one roller bearing and having a radially outermost surface, and
   the floating bearing being a unitary solid slide bearing,
   wherein the floating bearing has an inner surface and a radially outer surface, the outer surface of the floating bearing has a circumferential ridge that extends radially from the outer surface, the outer surface of the floating bearing directly mates with and contacts the cylindrical surface of the transmission housing such that the circumferential ridge is received within and directly engages the circular groove of the transmission housing and an entirety of the floating bearing is fixed in position relative to the transmission housing, and the inner surface of the floating bearing directly contacts the transmission shaft, the floating bearing facilitates rotation of the transmission shaft relative to the entirety of the floating bearing and the transmission housing, and axial sliding movement of the transmission shaft relative to the inner surface of the floating bearing and relative to the transmission housing, and
   a diameter of the radially outermost surface of the at least one gearwheel is greater than an outermost diameter of the circumferential ridge of the floating bearing and less than a diameter of the radially outermost surface of the fixed bearing.

2. The transmission shaft according to claim 1, wherein the at least one fixed bearing comprises a pair of bearings and the pair of bearings is in the form of an aligned mounting arrangement selected from the group consisting of an O-configuration and an X-configuration, and the at least one gearwheel comprising two gearwheels that are fixed on the transmission shaft in the axial direction between the at least one fixed bearing and the at least one floating bearing.

3. The transmission shaft according to claim 1, wherein the floating bearing has first and second opposite axial ends and the circumferential ridge is axially located centrally between the first and the second axial ends of the floating bearing and extends radially outward from the outer surface of the floating bearing around an entirety of the floating bearing.

4. A transmission for a wind turbine comprising:
   at least one spur gear stage,
   the spur gear stage comprising a transmission shaft that is mounted by at least one fixed bearing and a floating bearing, the transmission shaft defining a rotational axis,
   first and second gearwheels being fixed on the transmission shaft between the at least one fixed bearing and the floating bearing in an axial direction, and the at least one fixed bearing being formed by at least one roller bearing and having a radially outermost surface, and the floating bearing being formed by a slide bearing, and the first gearwheel having a radially outermost surface,
   wherein the floating bearing is a unitary solid slide bearing and has a radially inner surface, a radially outer surface and a radially outermost surface, the radially outer surface of the floating bearing directly contacting and mating with a cylindrical surface of a transmission housing such that an entirety of the floating bearing is at least axially fixed in position relative to the transmission housing of the wind turbine, and the inner surface of the floating bearing directly contacts and engages with the transmission shaft and facilitates rotation of the transmission shaft about the rotational axis and relative to the transmission housing and axial sliding movement of the transmission shaft along the rotational axis and relative to the transmission housing and the entirety of the floating bearing, and
   a diameter of the radially outermost surface of the first gearwheel is greater than a diameter of the radially outermost surface of the floating bearing and less than a diameter of the radially outermost surface of the fixed bearing.

5. The transmission according to claim 4, wherein the transmission shaft is an intermediate shaft, and the first gearwheel is fixed on the transmission shaft in the axial direction between the at least one fixed bearing and the second gearwheel, and the floating bearing is arranged on an axial side of the second gearwheel opposite from the first gearwheel.

6. The transmission according to claim 4, wherein the transmission shaft is an input shaft, and the second gearwheel is fixed on a shaft seating of the transmission shaft by a keyway between the floating bearing and the first gearwheel in the axial direction.

7. The transmission according to claim 4, wherein the transmission shaft is an output shaft, and the first gearwheel is fixed on the transmission shaft in the axial direction adjacent the at least one fixed bearing, and the second gearwheel is fixed on the transmission shaft by a keyway in the axial direction adjacent the floating bearing.

8. The transmission shaft according to claim 4, wherein the floating bearing has a raised ridge that extends radially from the outer surface of the floating bearing and forms the outermost surface of the floating bearing, the raised ridge extends in a circumferential direction around the outer surface of the floating bearing such that the diameter of the outermost surface of the floating bearing is always greater than a diameter of the outer surface of the floating bearing, and the cylindrical surface of the transmission housing has a circular mating groove, and the raised ridge is received by and directly abuts the mating groove such that the entirety of the floating bearing is axially fixed relative to the transmission housing.

9. A bearing mounting for a transmission shaft of a wind turbine, the transmission shaft defining a rotational axis, the bearing mounting comprising:
first and second gearwheels being rotationally fixed on the transmission shaft axially adjacent each other, the second gearwheel being rotationally fixed on the transmission shaft by means of a keyway, and the first gearwheel having a radially outermost surface;
a slide bearing being axially arranged on an axial side of the second gearwheel remote from the first gearwheel;
the slide bearing is a unitary, solid, slide bearing and has an inner surface, a radially outer surface and a radially outermost surface, and the outer surface of the slide bearing directly contacting and engaging a cylindrical surface of a transmission housing such that an entirety of the slide bearing is axially fixed in position relative to the transmission housing;
the inner surface of the slide bearing directly contacting and engaging with the transmission shaft and facilitating rotation of the transmission shaft about the rotational axis relative to the transmission housing and axial sliding movement of the transmission shaft along the rotational axis relative to the inner surface of the slide bearing and the transmission housing;
a fixed bearing being axially arranged on an axial side of the first gearwheel remote from the second gearwheel and the fixed bearing being mounted to the transmission housing for rotationally supporting the transmission shaft, and the fixed bearing having a radially outermost surface;
the fixed bearing comprising first and second conical roller bearings being arranged in a mirror-image configuration, the first conical roller bearing axially abuts a shoulder in the transmission housing and the second conical roller bearing axially abuts the first conical roller bearing such that the first and the second conical roller bearings are axially fixed between the shoulder in the transmission housing and a bearing cover bolted to the transmission housing; and
a diameter of the radially outermost surface of the first gearwheel is greater than a diameter of the radially outermost surface of the slide bearing and less than a diameter of the radially outermost surface of the fixed bearing.

10. The transmission shaft according to claim 9, wherein the slide bearing has first and second opposite axial ends and a raised ridge that is axially located centrally between the first and the second axial ends of the slide bearing, the raised ridge comprises the outermost surface of the slide bearing and side surfaces that extend radially outward from the outer surface and entirely around the outer surface of the slide bearing in a circumferential direction, and the cylindrical surface of the transmission housing has a circular mating groove that receives the raised ridge of the slide bearing such that the side surfaces of the raised ridge directly abut corresponding surfaces of the mating groove and axially fix the slide bearing to the transmission housing.

* * * * *